US011624357B2

(12) United States Patent
Pfefferl et al.

(10) Patent No.: US 11,624,357 B2
(45) Date of Patent: Apr. 11, 2023

(54) CONTROLLER APPARATUS AND METHOD FOR A COMPRESSED AIR SYSTEM

(71) Applicant: Bendix Commercial Vehicle Systems LLC, Elyria, OH (US)

(72) Inventors: David J. Pfefferl, Broadview Heights, OH (US); Timothy Carritte, Avon Lake, OH (US); Jason V. Shaffer, Avon Lake, OH (US)

( * ) Notice: Subject to any disclaimer, the term of this patent is extended or adjusted under 35 U.S.C. 154(b) by 116 days.

(21) Appl. No.: 17/371,642

(22) Filed: Jul. 9, 2021

(65) Prior Publication Data
US 2021/0332823 A1    Oct. 28, 2021

Related U.S. Application Data

(63) Continuation of application No. 16/288,625, filed on Feb. 28, 2019, now abandoned.

(51) Int. Cl.
| | |
|---|---|
| *F04D 15/02* | (2006.01) |
| *B60T 17/02* | (2006.01) |
| *B60T 17/00* | (2006.01) |
| *F04B 39/16* | (2006.01) |
| *F04B 41/02* | (2006.01) |
| *F04B 49/02* | (2006.01) |

(52) U.S. Cl.
CPC ............ *F04B 39/16* (2013.01); *B60T 17/004* (2013.01); *B60T 17/02* (2013.01); *F04B 41/02* (2013.01); *F04B 49/02* (2013.01); *F04D 15/0209* (2013.01)

(58) Field of Classification Search
CPC .... F04D 15/0209; B60T 17/004; B60T 17/02; F04B 2205/50; F04B 39/16; F04B 41/02; F04B 49/02; F04B 49/06; B01D 53/0454; B01D 2259/4566; B01D 53/261; B01D 2259/40052
See application file for complete search history.

(56) References Cited

U.S. PATENT DOCUMENTS

| | | | | |
|---|---|---|---|---|
| 5,103,576 | A | * | 4/1992 | Cramer ................ B01D 53/261 34/80 |
| 5,257,008 | A | * | 10/1993 | Elamin ................ B60T 17/004 340/602 |
| 5,592,754 | A | * | 1/1997 | Krieder ................ F04B 49/022 34/80 |

(Continued)

*Primary Examiner* — Dominick L Plakkoottam
(74) *Attorney, Agent, or Firm* — Cheryl L. Greenly; Brian E. Kondas; Eugene E. Clair

(57) ABSTRACT

A compressed air supply apparatus for heavy vehicles includes a service reservoir, an air dryer in communication with the service reservoir, a purge reservoir in communication with the air dryer, a compressor for delivering compressed air through the air dryer preferentially to the purge reservoir and then to the service reservoir and a controller. The controller interrupts the charge cycle of the compressor in response to a moisture accumulation value being equal to or exceeding a wetness threshold value and the pressure in the service reservoir being within a predetermined pressure range. The controller then initiates a modified purge cycle of the air dryer, which includes iteratively regenerating the air dryer with air from the purge reservoir until at least one of the moisture accumulation value is less than the wetness threshold value and the pressure in the service reservoir is outside the predetermined pressure range.

18 Claims, 4 Drawing Sheets

(56) References Cited

U.S. PATENT DOCUMENTS

| | | | | |
|---|---|---|---|---|
| 6,640,463 | B1* | 11/2003 | Beck | B60T 17/004 34/558 |
| 7,544,234 | B2* | 6/2009 | Fornof | B01D 53/261 96/147 |
| 8,403,427 | B2* | 3/2013 | Blackwood | B60T 17/004 303/2 |
| 8,490,991 | B2* | 7/2013 | Folchert | B60G 17/0523 280/124.16 |
| 2005/0120582 | A1* | 6/2005 | Moulding | B01D 53/261 34/473 |
| 2005/0252375 | A1* | 11/2005 | Iles | F02C 7/27 95/148 |
| 2006/0201023 | A1* | 9/2006 | Burke | B60T 17/004 34/573 |
| 2007/0169627 | A1* | 7/2007 | Fornof | B60T 17/004 96/108 |
| 2007/0199444 | A1* | 8/2007 | Fornof | B60T 17/004 95/26 |
| 2011/0052419 | A1* | 3/2011 | Bordacs | B60T 17/004 417/302 |
| 2015/0176575 | A1* | 6/2015 | Nemeth | F04B 49/022 417/34 |
| 2015/0217744 | A1* | 8/2015 | Minato | B60T 13/662 96/116 |
| 2015/0251645 | A1* | 9/2015 | Pfefferl | B01D 53/261 95/21 |
| 2017/0088110 | A1* | 3/2017 | Wright | B60T 17/004 |
| 2017/0095766 | A1* | 4/2017 | Wright | B61H 13/34 |
| 2017/0305372 | A1* | 10/2017 | Adler | F04B 49/20 |

\* cited by examiner

LEGEND

IC = Interrupted Charge
IC_FLG = Interrupted Charge Mode State
IC_FLG = TRUE → Interrupted Charge Mode is ON
IC_FLG = FALSE → Interrupted Charge Mode is OFF W = Wetness (Moisture) Level
Thresh = Wetness Threshold = 600 liters
Hyst = Wetness Hysteresis = 100 liters C_TMR = Charge Timer
C_MAX = Maximum Charge Time = 2 seconds
R_TMR = Regenerate Timer
R_MAX = Maximum Regenerate Time = 15 seconds P = Current System Pressure
Cut_In = Cut In Pressure = 110 PSI
Cut_Out = Cut_Out Pressure = 130 PSI
IC_Range = Interrupted Charge Pressure Range = 115 to 125 PSI

Fig. 2B

CONTROLLER APPARATUS AND METHOD FOR A COMPRESSED AIR SYSTEM

CROSS REFERENCE TO RELATED APPLICATION

This application is a continuation of the pending U.S. patent application Ser. No. 16/288,625 entitled "Controller Apparatus and Method for a Compressed Air System" filed Feb. 28, 2019, the entire disclosure of which is incorporated fully herein by reference.

BACKGROUND

The present application relates to compressed air systems for heavy vehicles, locomotives and/or auxiliary devices that use compressed air. Typical heavy vehicle compressed air systems include a compressor for compressing the air, an air dryer assembly for removing moisture and contaminants from the compressed air, a reservoir for storing the compressed air and valves and other pneumatic system components for distributing the compressed air. The compressed air system finds particular application in conjunction with heavy vehicles that use compressed air to selectively control application of vehicle brakes and will be described with particular reference thereto.

The compressor provides compressed air to a reservoir, the compressed air being used to operate vehicle brakes and other air operated systems associated with the vehicle. Ambient air is typically drawn into a compressor inlet for compression during an air delivery, or charging, cycle. The compressor is typically supplied with oil in order to lubricate bearings and other components of the compressor.

Typically, the air dryer assembly is installed downstream from the compressor for reducing the moisture content of the compressed air. The air dryer assembly delivers substantially dry compressed air to a service reservoir for use by braking system components, thereby increasing the service life of braking system components such as valves and pneumatic brake actuators. Providing clean dry compressed air to brake system components reduces maintenance costs. In some air dryers, a desiccant is used to adsorb water vapor as the compressed air passes through the air dryer assembly during a charging cycle. Liquid water, water vapor, and contaminants are adsorbed onto the desiccant. After a period of charging during normal operation, the desiccant becomes entrained with water and requires regeneration (i.e. removal of the water). The desiccant is regenerated through a purge cycle, which comprises passing treated pressurized air in a reverse direction through the desiccant.

In some air dryer systems, a purge cycle is initiated in response to the service reservoir reaching a predetermined pressure (i.e., a cut out pressure) and the compressor being in an unloaded state, or not delivering air. The purge cycle continues until all of the air in a purge reservoir is exhausted through the air dryer desiccant. Generally, for a given air vehicle dryer system and purge reservoir size, the purge cycle is the same duration no matter how long the system may have been charging or how entrained with water, or moist, the air dryer desiccant may have been. That is, the purge duration is the time it takes to empty the purge reservoir.

A subsequent purge cycle only occurs after the compressor returns to a delivery cycle, then unloaded again when the service reservoir reaches the cut out pressure. The typical air dryer using a standard purge may not be able to remove all of the moisture in the dryer desiccant, thereby deleteriously passing moisture downstream. The moist air will enter the purge reservoir, so moisture accumulates and subsequent purges would be less effective since moist air is used in the purge. For example, if overly long charge cycles or air leaks should occur, the pressure in the service reservoir may not reach the cut out pressure. This would result in moisture accumulation in the dryer desiccant to the point where the moisture can flow downstream, thereby decreasing the service life of the braking system components.

For the foregoing reasons, there is a need for a new and improved apparatus and methods which address the above-referenced problems.

SUMMARY

In accordance with one embodiment, a controller apparatus is provided for a compressed air system. The controller apparatus comprises a control output for transmitting a control signal to interrupt a charge cycle of an associated compressor in a loading state. The controller apparatus further comprises control logic capable of initiating an interrupted charge cycle of the compressor based upon a moisture accumulation value indicative of the extent of moisture accumulated in an associated air dryer during the charge cycle of the compressor in the loading state.

In accordance with another embodiment, a compressed air apparatus comprises a service reservoir, an air dryer, and a compressor for delivering compressed air through the air dryer to the service reservoir during a charge cycle of the compressor in a loading state. The compressed air apparatus further comprises a controller arranged to interrupt the charge cycle of the compressor in the loading state in response to a wetness accumulation value associated with the air dryer reaching a predetermined wetness threshold value.

In accordance with yet another embodiment, a compressed air apparatus comprises a service reservoir, an air dryer, and a compressor for delivering compressed air through the air dryer to the service reservoir when pressure in the service reservoir is between a cut in pressure and a cut out pressure. The compressed air apparatus further comprises means for interrupting delivery of compressed air through the air dryer to the service reservoir when the pressure in the service reservoir is between the cut in pressure and the cut out pressure.

In accordance with still another embodiment, a method is provided for interrupting operation of a compressor charge cycle to remove excess moisture accumulated in an air dryer through which compressed air from a purge reservoir flows to dry the compressed air. The method comprises determining a moisture accumulation value indicative of the extent of moisture accumulated in the air dryer during a charge cycle of the compressor in a loading state. The method further comprises interrupting the charge cycle of the compressor when the moisture accumulation value reaches a predetermined moisture accumulation threshold value.

BRIEF DESCRIPTION OF THE DRAWINGS

FIGS. 2A and 2B are a flow diagram depicting an example method in accordance with an embodiment.

DETAILED DESCRIPTION

Figure 1:
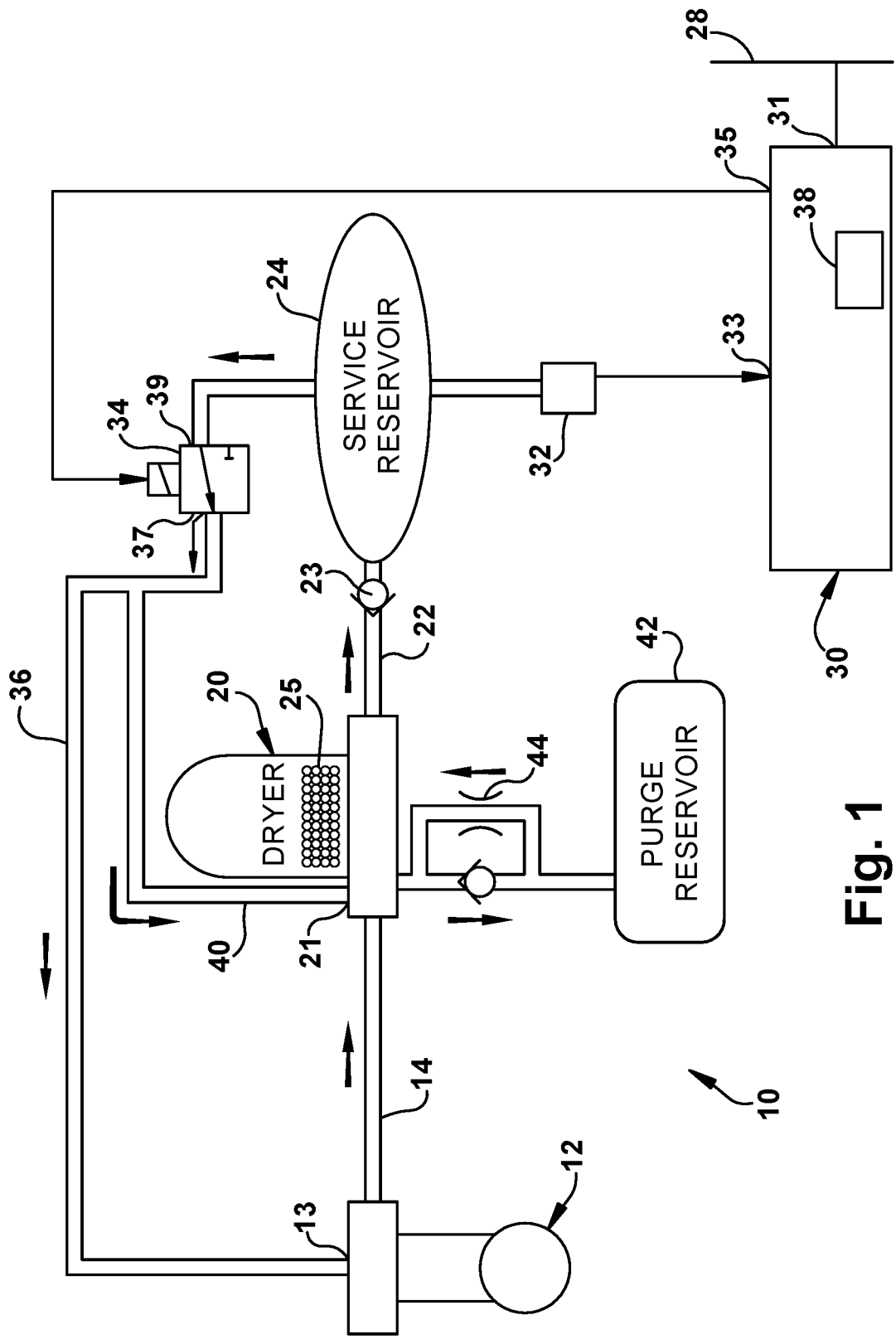
FIG. 1 is a schematic diagram of a vehicle air charging system including example apparatus constructed in accordance with an embodiment.

Referring to FIG. 1, an air charging system 10 for a vehicle according to one embodiment is shown. The air charging system 10 includes a compressor 12 for compressing ambient air. The compressor 12 includes a control input 13 for receiving a pneumatic signal. The presence of a pneumatic signal at the control input 13 changes the compressor 12 to an unloaded state, where the compressor 12 is not compressing air. The output of the compressor 12 is in fluid communication with an air dryer 20 via line 14.

The air dryer 20 receives the compressed air from the compressor 12 via line 14 when the compressor 12 is in a charging, or loaded, state. The air dryer 20 is operative to remove moisture from the compressed air, for example, by use of a desiccant 25, and to remove contaminants, such as oil, from the compressed air by use of a filter (not shown). The air dryer 20 includes a control input 21 for receiving a pneumatic signal. The presence of a pneumatic signal at the control input 21 initiates a purge cycle in the air dryer 20. The air dryer 20 is in fluid communication with at least one service reservoir 24 via line 22 for supplying air to braking system components (not shown). A check valve 23 prevents reverse flow from the service reservoir 24 to the air dryer 20.

The air dryer 20 communicates pneumatically with a purge reservoir 42. The air dryer 20 is in fluid communication with the purge reservoir 42 via a valve 44. The air flows into the purge reservoir 42 via a check valve portion of the valve 44 and returns to the air dryer 20 during the purge cycle via an orifice valve portion of the valve 44. Alternatively, a pressure protection valve could be inserted between the purge reservoir 42 and the air dryer 20. The purge reservoir 42 may be integral to the air dryer 20 or located remotely from the air dryer 20. The purge reservoir 42 preferentially receives clean dry air from the air dryer 20, thereby receiving the first dried air. Alternatively, the purge reservoir 42 may receive the compressed air at the same time as the at least one service reservoir 24.

The purge cycle initiated in the air dryer 20 can be a standard purge cycle, wherein the air from the purge reservoir 42 continues through the air dryer 20 until the air volume of the purge reservoir 42 is depleted. Alternatively, the purge cycle initiated in the air dryer 20 can be a modified purge cycle. A modified purge cycle is initiated when a charge cycle of the compressor 12 between standard purge cycles is interrupted, as will be described herein.

The air charging system 10 includes a controller 30 for controlling the compressor 12 and the air dryer 20. Although the controller 30 is shown in FIG. 1 as being located remotely from the air dryer 20, it is conceivable that the controller 30 be integral to the air dryer 20. The controller 30 includes a pressure input 33 for receiving a pressure signal indicative of the pressure of compressed air in the service reservoir 24. The signal may be from a pressure sensor 32 in pneumatic communication with the service reservoir 24. The pressure sensor 32 may be connected directly to the service reservoir 24 or may be located remotely from the service reservoir 24. The controller 30 may be connected directly or indirectly to the pressure sensor 32.

The controller 30 includes a bus port 31 for communicating with a serial communications bus 28. The controller 30 receives information or data from bus port 31 via the serial communications bus 28. For example, a signal may indicate the pressure of compressed air in the service reservoir 24. The controller 30 may also receive a signal indicative of an engine speed, a compressor rating, or the flow rate of compressed air from the compressor 12 through the air dryer 20 during a charge cycle. In addition, an accumulated volume of air, which is a volume of compressed air delivered to the air dryer 20 since the installation of the controller 30 or since a prior standard purge cycle, or other information relative to the operation of the air charging system 10 may be transmitted via the serial communications bus 28.

The controller 30 includes control logic 38. The control logic 38 is capable of determining a moisture accumulation value. The moisture accumulation value is indicative of the extent of moisture (i.e., wetness) accumulated in the air dryer 20 during a charge cycle of the compressor 12 in the loaded state. As an example, the moisture accumulation value can be calculated based upon the flow rate of compressed air through the air dryer 20 since the last standard purge cycle. As another example, the control logic 38 may include a timer. In this case, the control logic 38 may calculate the moisture accumulation value based on the time the compressor 12 is in the loaded state since a prior standard purge cycle, the engine speed, the compressor rating, the flow rate of compressed air through the air dryer 20, and other information. Other ways of calculating a moisture accumulation value are possible.

The moisture accumulation value is set at zero when the controller 30 is first installed on a vehicle. The moisture accumulation value is not set to zero after each modified purge cycle. Alternatively, the control logic 38 may receive the moisture accumulation value via the serial communications bus 28 or other means.

The control logic 38 may include volatile, non-volatile memory, solid state memory, flash memory, random-access memory (RAM), read-only memory (ROM), electronic erasable programmable read-only memory (EEPROM), variants of the foregoing memory types, combinations thereof, and/or any other type(s) of memory suitable for providing the described functionality and/or storing computer-executable instructions for execution by the control logic 38. Known values such as the compressor rating of the compressor 12, the characteristics of the air dryer 20, the size of the service reservoir 24, and the size of the purge reservoir 42 may be stored in the memory of the control logic 38.

The controller 30 includes a control output 35 for transmitting a control signal to an electropneumatic device 34. Alternatively, the controller 30 may transmit a control signal via port 31 to the serial communications bus 28. The electropneumatic device 34 may be, for example, a solenoid or a switch. The pneumatic output 37 of the electropneumatic device 34 is pneumatically connected to the control input 13 of the compressor 12 via line 36 and to the control input 21 of the air dryer 20 via line 40. The electropneumatic device 34 communicates pneumatically with the service reservoir 24 via a pneumatic input 39.

The controller 30 is capable of setting the compressor 12 in a loaded state, when it is delivering air to the air dryer 20, or unloaded state, when it is no longer delivering air to the air dryer 20. The controller 30 is capable of transmitting a signal to the electropneumatic device 34 via the control output 35 to activate the electropneumatic device 34. Activating the electropneumatic device 34 allows pneumatic communication from the service reservoir 24 to the line 36 to initiate an unloaded state of compressor 12.

When the compressor 12 receives the pneumatic control signal at the control input 13 from the electropneumatic device 34, the compressor 12 is in the unloaded state. In the unloaded state, the compressor 12 is no longer delivering air to the air dryer 20 via line 14. The compressor 12 is typically set in the unloaded state when the pressure in the service reservoir 24 is greater than a cut out pressure. In one example, the cut out pressure ranges from about 105 psi to about 125 psi. In another example, the cut out pressure ranges from about 120 psi to about 140 psi. The compressor 12 is typically set in the loaded state when the pressure in the service reservoir 24 is less than or equal to a cut in pressure. In one example, the cut in pressure ranges from about 90 psi to about 105 psi. In another example, the cut in pressure ranges from about 100 psi to about 115 psi.

The control logic 38 is capable of initiating a standard purge cycle or a modified purge cycle of the air dryer 20. The control logic 38 is capable of transmitting the control signal to the electropneumatic device 34 via the control output 35 to activate the electropneumatic device 34 to initiate the standard purge cycle or the modified purge cycle of the air dryer 20. Activating the electropneumatic device 34 allows pneumatic communication from the service reservoir 24 to the line 40 to the control input 21 of the air dryer 20. When the air dryer 20 receives the pneumatic control signal, the standard purge cycle or the modified purge cycle begins. The pneumatic signal from the output 37 of the electropneumatic device 34 may go to both the compressor control input 13 and the air dryer control input 21 simultaneously so that the standard purge cycle or the modified purge cycle would be initiated at the same time the compressor 12 is in the unloaded state.

During the standard purge cycle or the modified purge cycle, the air dryer 20 no longer transmits air via line 22 to the service reservoir 24. Rather, when the control signal is received at control input 21, a path to atmosphere is opened, causing a drop in pressure at the air dryer 20. The air from the purge reservoir 42 begins to flow in a reverse direction through the air dryer 20 through the orifice portion of valve 44. The rate of flow of pressurized air through the air dryer 20 is controlled at least partially by the size of the orifice. Air flows from the purge reservoir 42 through the air dryer 20 collecting water vapor and contaminants to expel to atmosphere until the air volume of the purge reservoir 42 is completely depleted, as in a standard purge cycle, or until the pneumatic control signal from the electropneumatic device 34 is terminated, as in a modified purge cycle. The service reservoir 24 is not depleted during a standard purge cycle or modified purge cycle because the check valve 23 only allows air to flow from the air dryer 20 into the service reservoir 24.

The control logic 38 is capable of initiating a standard purge cycle based on the signal indicative of the pressure of compressed air in the service reservoir 24. In a standard purge cycle, the air flow from the purge reservoir 42 continues through the air dryer 20 until the air volume of the purge reservoir 42 is depleted or substantially depleted.

The control logic 38 is capable of initiating a modified purge cycle based on the moisture accumulation value associated with the air dryer 20. In a modified purge cycle, the air flow from the purge reservoir 42 continues through the air dryer 20 until the moisture accumulation value associated with the air dryer 20 drops below a predetermined value or the interruption time associated with the compressor 12 reaches a predetermined time limit.

More specifically, the control logic 38 is capable of initiating a modified purge cycle of the air dryer 20 to regenerate the desiccant 25 of the air dryer 20 in response to the control logic 38 having initiated an interrupted charge cycle of the compressor 12 in the loading state. The interrupted charge cycle of the compressor 12 is maintained until the moisture accumulation value drops below a predetermined moisture accumulation value associated with the air dryer 20 or an accumulated interruption time associated with the compressor 12 reaches a predetermined maximum interruption time limit, details of which will be further described below.

Figure 2A:
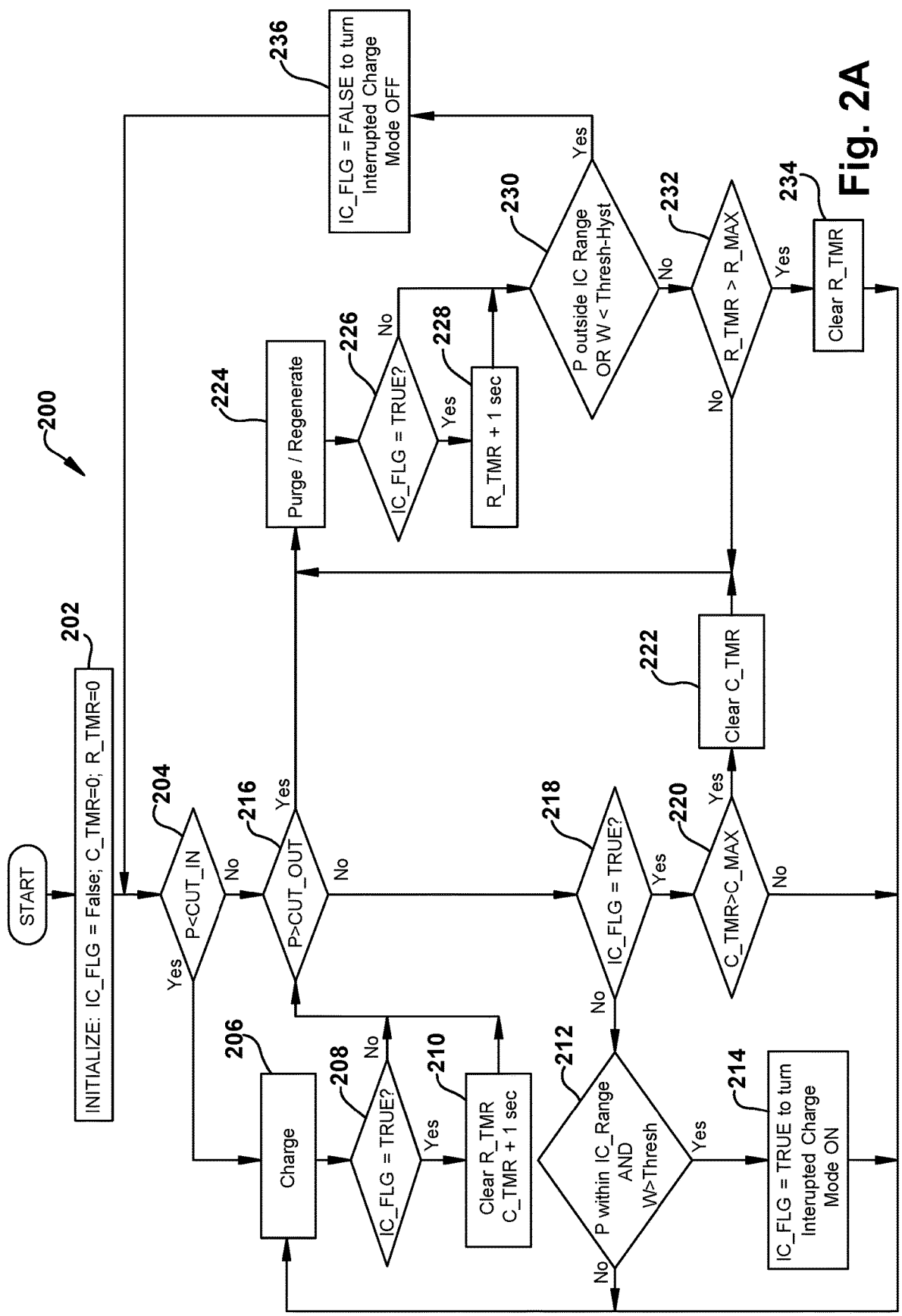

Referring to FIGS. 2A and 2B, a flow diagram 200 depicts a method in accordance with an embodiment. FIG. 2B shows the legend of the abbreviations used in the blocks in FIG. 2A. As shown in FIG. 2B, the abbreviation "IC" stands for "interrupted charge". The abbreviation "IC_FLG" stands for "interrupted charge mode state". If IC_FLG is set to "TRUE", then the interrupted charge mode is ON. However, if IC_FLG is set to "FALSE", then the interrupted charge mode is OFF.

The abbreviation "W" stands for "wetness level" (i.e., a moisture level). The abbreviation "Thresh" stands for "wetness threshold" which is a high wetness threshold value for comparing with the wetness level W. An example value for Thresh is 600 liters. The abbreviation "Hyst" stands for "wetness hysteresis" which is a high wetness hysteresis value that is used to compensate for pressure fluctuations around the cut in pressure Cut_In when the wetness level W is compared with the wetness threshold Thresh. An example value for Hyst is 100 liters.

The abbreviation "C_TMR" stands for "charge timer" which is indicative of the actual time that the purge reservoir 42 has charged after the interrupted charge mode is turned ON. The abbreviation "C_MAX" stands for the maximum amount of time that the purge reservoir 42 is allowed to charge after the interrupted charge mode is turned ON. An example value for C_MAX is two seconds. The abbreviation "R_TMR" stands for the actual time that the air dryer 20 has regenerated after the interrupted charge mode is turned ON. The abbreviation "R_MAX" stands for the maximum amount of time that the air dryer 20 is allowed to regenerate after the interrupted charge mode is turned ON. An example value for R_MAX is about 15 seconds.

The abbreviation "P" stands for "current system pressure". As an example, the current system pressure may be the air pressure in the service reservoir 24. The abbreviation "Cut_In" stands for "cut in pressure". The cut in pressure Cut_In is a preset pressure at which the compressor 12 starts building air to fill the service reservoir 24 when the air pressure in the service reservoir 24 drops below the cut in pressure Cut_In. An example value for the cut in pressure Cut_In is 110 psi. The abbreviation "Cut_Out" stands for "cut out pressure". The cut out pressure Cut_Out is a preset pressure setting at which the compressor 12 stops building air and the air dryer 20 goes into a standard purge cycle when the air pressure in the service reservoir 24 reaches the cut out pressure Cut_Out. An example value for the cut out pressure Cut_Out is 130 psi. The abbreviation "IC_Range" stands for "interrupted charge pressure range". The current system pressure P needs to be within this pressure range before the interrupted charge mode can be turned ON. An example pressure range is from 115 psi to 125 psi, which is between the cut in pressure Cut_In and the cut out pressure Cut_Out.

Different modes of operation for the vehicle air charging system 10 of FIG. 1 are illustrated in FIG. 2A. One mode of operation is normal loading (i.e., charging) of the compressor 12 with no excess moisture accumulated in the air dryer 20. Another mode of operation is normal unloading of the compressor 12 with no excess moisture accumulated in the air dryer 20. Still another mode of operation is interrupted compressor loading with excess moisture accumulated in the air dryer 20 (referred to herein also as "compressor interruption mode"). Yet another mode of operation is regeneration of the air dryer 20 during an interrupted charging cycle of the compressor 12 (referred to herein also as "air dryer regeneration mode"). Each of the above modes of operation is described in detail with reference to FIG. 2A.

As shown in FIG. 2A, the IC_FLG is initialized to FALSE (i.e., setting interrupted charge mode OFF), and both C_TMR and R_TMR are initialized to zero.

Normal Compressor Loading with No Excess Moisture

In block 204, a determination is made as to whether the current system pressure P is less than the cut in pressure Cut_In. Since the compressor 12 is normally loading (i.e., charging), the determination in block 204 is affirmative (i.e., P is less than Cut_In). The process continues to block 206 in which the compressor 12 continues charging. Then, in block 208, a determination is made as to whether IC_FLG is TRUE (i.e., the interrupted charge state mode state is ON). Since IC_FLG has been initialized to FALSE, the process proceeds to block 216.

In block 216, a determination is made as to whether the current system pressure P is greater than the cut out pressure Cut_Out. Assuming that the current system pressure has not yet reached the cut out pressure Cut_Out for purposes of discussion, the process proceeds to block 218. In block 218, a determination is made as to whether IC_FLG is TRUE. Since IC_FLG has been initialized to FALSE, the process proceeds to block 212.

In block 212, a determination is made as to whether the current system pressure P is within the interrupted charge pressure range IC_Range and the wetness level W is greater than the wetness threshold Thresh. Since there is no excess air dryer moisture, the process proceeds back to block 206 to continue with normal compressor loading. The process repeats the loop formed by blocks 206, 208, 216, 218, 212, and back to 206 until the current system pressure P reaches the cut out pressure Cut_Out in block 216. When this occurs, the process proceeds from block 216 to block 224. The mode of normal compressor loading with no excess air dryer moisture ends and the mode of normal compressor unloading with no excess air dryer moisture starts, as will be described next.

Normal Compressor Unloading with No Excess Moisture

In block 224, a standard purge cycle of the air dryer 20 begins. While purging, a determination is made in block 226 as to whether IC_FLG is TRUE. Since IC_FLG has been initialized to FALSE, the process proceeds to block 230. A determination is made in block 230 as to whether the current system pressure P is outside of the interrupted charge pressure range IC_Range or the wetness level W is less than the wetness threshold Thresh. Since there is no excess air dryer moisture and the IC_FLG is set to FALSE, the process proceeds through block 236 back to block 204.

Assuming for purposes of discussion that the current system pressure P is still greater than the cut out pressure Cut_Out (as was determined back in block 216), the process proceeds through block 204 and block 216 to block 224 to continue the standard purge cycle of the air dryer 20. The process repeats the loop formed by blocks 224, 226, 230, 236, 204, 216, and back to 224 until the current system pressure P drops below the cut in pressure Cut_In. When this occurs, the mode of normal compressor unloading with no excess air dryer moisture ends and the mode of normal compressor loading with no excess air dryer moisture starts again as described hereinabove.

When the compressor 12 is loading (i.e., charging) and if excess air moisture should accumulate within the air dryer 20, the charging cycle of the compressor 12 is interrupted, as will be described next.

Interrupted Compressor Loading with Excess Moisture

In block 206, the compressor 12 continues charging. Then, in block 208, a determination is made as to whether IC_FLG is TRUE (i.e., whether the interrupted charge state mode state is ON). Since IC_FLG has been initialized to FALSE, the process proceeds to block 216.

In block 216, a determination is made as to whether the current system pressure P is greater than the cut out pressure Cut_Out. Assuming that the current system pressure has not yet reached the cut out pressure Cut_Out for purposes of discussion, the process proceeds to block 218. In block 218, a determination is made as to whether IC_FLG is TRUE. Since IC_FLG has been initialized to FALSE, the process proceeds to block 212.

In block 212, a determination is made as to whether the current system pressure P is within the interrupted charge pressure range IC_Range and the wetness level W is greater than the wetness threshold Thresh. For purposes of discussion at this point, it is assumed that the current system pressure P is within the interrupted charge pressure range IC_Range while the compressor 12 is charging. The interrupted charge pressure range IC_Range is a user-acceptable pressure range that is well below the cut out pressure Cut_Out and well above the cut in pressure Cut_In. Accordingly, since there is excess air dryer moisture (i.e., W>Thresh), the process proceeds to block 214 in which IC_FLG is set to TRUE to turn the interrupted charge mode ON. The process returns back to block 206 to continue charging.

The process then proceeds from block 206 to block 208 in which a determination is made as to whether the interrupted charge mode is ON (i.e., IC_FLG=TRUE). With the IC_FLG having been set to TRUE in block 214, the process proceeds to block 210. In block 210, the regenerate timer R_TMR is cleared (i.e., set to zero) and the charge timer C_TMR is incremented by one second before proceeding to block 216.

Assuming for purposes of discussion that the current system pressure P has not yet reached the cut out pressure Cut_Out, the process proceeds from block 216 to block 218. Since IC_FLG is now TRUE, the process proceeds to block 220 in which a determination is made as to whether the charge timer C_TMR is greater than the maximum charge time C_MAX. If the determination is block is negative (i.e., C_TMR is not greater than C_MAX), the process returns back to block 206 to continue charging by the compressor 12. The process repeats the loop formed by blocks 206, 208, 210, 216, 218, 220 and back to 206 until the charge timer C_TMR is greater than C_MAX. By repeating this loop using an example C_MAX value of two seconds, the purge reservoir 42 is assured to refill with sufficient compressed air from the compressor 12 in case the purge reservoir 42 should happen to be empty. Accordingly, the purge reservoir 42 is charged with compressed air from the compressor 12 until an accumulated purge reservoir charge time (C_TMR) reaches the predetermined maximum purge reservoir charge time limit (C_MAX).

When the charge timer C_TMR becomes greater than C_MAX in the loop formed by blocks 206, 208, 210, 216, 218, 220 and back to 206, the process proceeds from block 220 to block 222. The mode of interrupted compressor loading with excess air dryer moisture (i.e., the compressor interruption mode) ends and the mode of air dryer regeneration during an interrupted charge cycle of compressor (i.e., the air dryer regeneration mode) starts, as will be described next.

Air Dryer Regeneration During Interrupted Charge Cycle of Compressor

In block 222, the charge timer C_TMR is cleared (i.e., set to zero). The process then proceeds to block 224 in which the air dryer 20 is regenerated with compressed air from the purge reservoir 42 to start a modified purge cycle. Then, in block 226, a determination is made as to whether the interruption charge mode is turned ON (i.e., IC_FLG set to TRUE). Since the interruption charge mode was turned ON back in block 214, the process proceeds to block 228. In block 228, the regenerate timer R_TMR is incremented by one second before proceeding to block 230.

A determination is made in block 230 as to whether the current system pressure P is outside of the interrupted charge pressure range IC_Range or the wetness level W is less than the wetness threshold Thresh minus the wetness hysteresis Hyst. For purposes of discussion, it is assumed that the current system pressure P is not outside of the interrupted charge pressure range IC_Range (i.e., the current system pressure P is in a user-acceptable range). Otherwise, the process would proceed to block 236 to discontinue the modified purge cycle of the air dryer 20 and deactivate the interrupted charge cycle of the compressor 12. However, since there is excess air dryer moisture, the process proceeds to block 232.

In block 232, a determination is made as to whether the regenerate timer R_TMR is greater than the maximum regenerate time R_MAX. If the determination in block 232 is negative (i.e., R_TMR is not greater than R_MAX), the process returns back to block 224 to continue regenerating of the air dryer 20 by compressed air from the purge reservoir 42, and thereby to continue the modified purge cycle of the air dryer 20. The process repeats the loop formed by blocks 224, 226, 228, 230, 232, and back to 224 until the regenerate timer R_TMR is greater than R_MAX. By repeating this loop using an example R_MAX value of about 15 seconds, the regenerate time of the air dryer 20 is limited to substantially 15 seconds.

When the charge timer R_TMR becomes greater than R_MAX in the loop formed by blocks 224, 226, 228, 230, 232, and back to 224, the process proceeds from block 232 to block 234. In block 234, the R_MAX is cleared (i.e., set to zero) before returning back to block 206 to continue the compressor charging cycle that was interrupted when the wetness level W reached the wetness threshold Thresh, as was determined in block 212.

The above-described compressor interruption mode and air dryer regeneration mode are iteratively repeated until there is no longer excess moisture accumulated in the air dryer 20. The determination that there is no longer excess moisture accumulated in the air dryer 20 is made in block 230 when the wetness W drops below the wetness threshold Thresh minus the wetness hysteresis Hyst. When this occurs, the process proceeds to block 236 to exit the air dryer regeneration mode and to set the IC_FLG to FALSE to indicate that the interrupted charge mode is now turned OFF. When the interrupted charge mode is turned OFF, both the compressor interruption mode and the air dryer regeneration mode are deactivated in the processes of FIG. 2A.

It is conceivable that current system pressure P in block 230 may have moved outside of the IC_Range even though the wetness W has not yet dropped below Thresh minus Hyst. In this case, the process still proceeds to block 236 to exit the air dryer regeneration mode. This is desirable to ensure that the current system pressure P is in a user-acceptable range before the process proceeds to block 232 to remain in the air dryer regeneration mode. Similarly, as shown in block 212, it is desirable to ensure that the current system pressure P is within the IC_Range (i.e., within a user-acceptable pressure range) before the process proceeds to block 214 to set IC_FLG to TRUE to turn the interrupted charge mode ON in response to the wetness reaching the wetness threshold Thresh.

Figure 3:
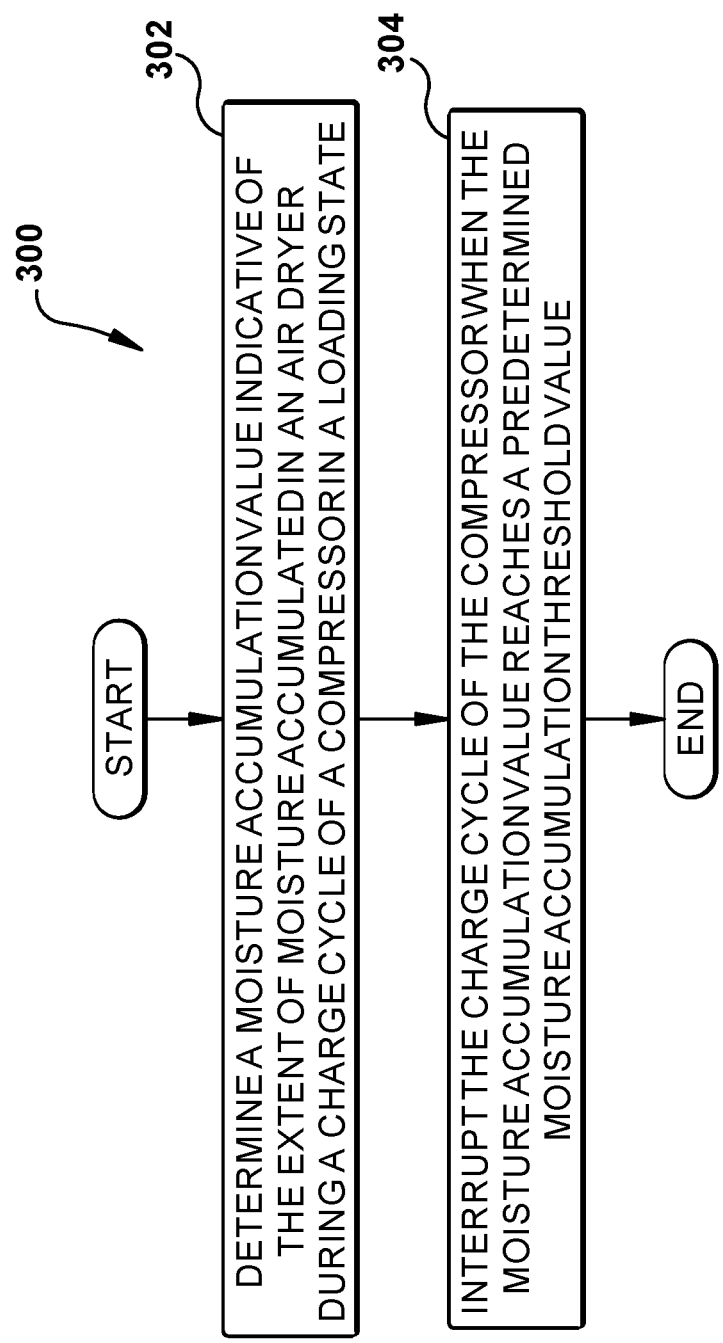
FIG. 3 is a flow diagram depicting an example method in accordance with another embodiment.

Referring to FIG. 3, a flow diagram 300 depicts a method in accordance with another embodiment. The method is provided for interrupting operation of a compressor charge cycle to remove excess moisture accumulated in an air dryer through which compressed air from a purge reservoir flows to dry the compressed air. In block 302, a determination is made of a moisture accumulation value indicative of the extent of moisture accumulated in the air dryer during a charge cycle of the compressor in a loading state. Then, in block 304, the charge cycle of the compressor is interrupted when the moisture accumulation value reaches a predetermined moisture accumulation threshold value.

In some embodiments, the interrupting the charge cycle of the compressor when the moisture accumulation value reaches a predetermined moisture accumulation threshold value includes iteratively interrupting the charge cycle of the compressor until the moisture accumulation value drops below the predetermined moisture accumulation threshold value.

In some embodiments, the interrupting the charge cycle of the compressor when the moisture accumulation value reaches a predetermined moisture accumulation threshold value includes iteratively interrupting the charge cycle of the compressor until an accumulated interruption time reaches a predetermined maximum interruption time limit.

In some embodiments, the determining a moisture accumulation value indicative of the extent of moisture accumulated in the air dryer during a charge cycle of the compressor in a loading state includes determining the moisture accumulation value based upon an output parameter of the compressor during the charge cycle.

In some embodiments, the determining the moisture accumulation value based upon an output parameter of the compressor during the charge cycle includes determining the moisture accumulation value based upon flow rate of compressed air from the compressor through the air dryer during the charge cycle.

In some embodiments, the method further comprises after the moisture accumulation value is determined and before the charge cycle of the compressor is interrupted, charging a purge reservoir with compressed air from the compressor until an accumulated purge reservoir charge time reaches a predetermined maximum purge reservoir charge time limit.

It should be apparent that the above-described controller 30 including control logic 38 are arranged to provide the compressor interrupt mode and the air dryer regeneration mode to iteratively (i.e., repeatedly) reduce excessive desiccant wetness to an acceptable level. The excessive desiccant level may be caused, for example, by overly long charge cycles or air leaks where the compressor 12 is delivering air but the current system pressure P does not reach the cut out pressure Cut_Out and a normal purge cycle does not occur. The interrupted charge cycle of the compressor 12 is maintained until the moisture accumulation value drops below a predetermined moisture accumulation threshold value or until an accumulated interruption time reaches a predetermined maximum interruption time limit. The predetermined maximum interruption time limit is substantially equal to the sum of a predetermined maximum purge reservoir charge time limit (e.g., C_MAX) and a predetermined maximum regeneration time limit (e.g., R_MAX).

It should also be apparent that the above-described regeneration of the air dryer 20 is based on two different timers (i.e., C_TMR and R_TMR) that are both reset after each modified purge cycle. This provides the advantages of known charge and regeneration timing while in compressor interruption mode.

It should further be apparent that the above-described controller 30 including control logic 38 provide dynamic operation of the interrupted charge cycle of the compressor 12 and the modified purge cycle of the air dryer 20. The interrupted charge cycle and the modified purge cycle are configurable. The configurability is provided by selecting parameters including parameters listed in FIG. 2B to activate the interrupt charge cycle and the modified purge cycle in the middle of a long charging cycle of the compressor 12. The parameters are stored in the memory of the controller 30.

Although the above-description describes the controller 30 including control logic 38 being used in a heavy vehicle such as a truck, it is conceivable that the controller 30 including control logic 38 may be used in other types of heavy vehicles, such as busses for example.

While the present invention has been illustrated by the description of example processes and system components, and while the various processes and components have been described in detail, applicant does not intend to restrict or in any way limit the scope of the appended claims to such detail. Additional modifications will also readily appear to those skilled in the art. The invention in its broadest aspects is therefore not limited to the specific details, implementations, or illustrative examples shown and described. Accordingly, departures may be made from such details without departing from the spirit or scope of applicant's general inventive concept.

What is claimed is:

1. A controller apparatus for a compressed air system, the controller apparatus comprising:
    a pressure input for receiving a signal indicative of a system pressure in an associated service reservoir;
    a control output for transmitting a control signal for controlling a purge cycle of an associated air dryer and a charge cycle of an associated compressor, the associated compressor providing compressed air preferentially to an associated purge reservoir and then to the associated service reservoir until the system pressure reaches a cut out pressure during a normal charge cycle; and
    control logic capable of:
        transmitting the control signal to interrupt the normal charge cycle of the associated compressor based upon a moisture accumulation value indicative of moisture accumulated in the associated air dryer during the normal charge cycle of the compressor being equal to or greater than a wetness threshold and system pressure being within a predetermined pressure range, and
        transmitting a control signal to initiate a modified purge cycle of the associated air dryer, wherein the modified purge cycle includes iteratively regenerating the associated air dryer with air from the associated purge reservoir until at least one of the moisture accumulation value is less than the wetness threshold and the system pressure is outside the predetermined pressure range.

2. The controller apparatus according to claim 1, wherein the predetermined pressure range is configurable to be less than the cut out pressure and greater than a cut in pressure.

3. The controller apparatus according to claim 1, wherein the modified purge cycle further includes providing compressed air from the associated compressor to the associated purge reservoir for a predetermined maximum purge reservoir charge time between each regeneration iteration.

4. The controller apparatus according to claim 3, wherein the predetermined maximum purge reservoir charge time is configurable.

5. The controller apparatus according to claim 3, wherein the predetermined maximum purge reservoir charge time is about two seconds.

6. The controller apparatus according to claim 1, wherein the modified purge cycle further includes regenerating the associated air dryer for a maximum regenerate time.

7. The controller apparatus according to claim 6, wherein the maximum regenerate time is configurable.

8. The controller apparatus according to claim 6, wherein the maximum regenerate time is about fifteen seconds.

9. A compressed air supply apparatus comprising:
    a service reservoir;
    a purge reservoir;
    a sensor in communication with the service reservoir for measuring system pressure;
    an air dryer in communication with the purge reservoir and the service reservoir;
    a compressor for delivering compressed air through the air dryer preferentially to the purge reservoir and then to the service reservoir during a charge cycle of the compressor; and
    a controller arranged to interrupt the charge cycle of the compressor in response to a moisture accumulation value associated with the air dryer being equal to or greater than a wetness threshold value and the system pressure being within a predetermined pressure range, and to initiate a modified purge cycle of the air dryer, wherein the modified purge cycle includes iteratively regenerating the air dryer with air from the purge reservoir until at least one of the moisture accumulation value is less than the wetness threshold value and the system pressure is outside the predetermined pressure range.

10. The compressed air supply apparatus as in claim 9, wherein the modified purge cycle includes delivering compressed air to the purge reservoir for a predetermined maximum purge reservoir charge time and regenerating the air dryer for a maximum regenerate time during each iteration.

11. The compressed air supply apparatus as in claim 9, wherein the purge reservoir is integral with the air dryer.

12. The compressed air supply apparatus according to claim 9, wherein the system pressure is not reduced to perform the modified purge cycle.

13. The compressed air supply apparatus according to claim 9, wherein only air from the purge reservoir is used to perform the modified purge cycle.

14. A method for removing excess moisture accumulated in an air dryer, the method comprising:
    providing pressurized air from a compressor to an air dryer, then to a purge reservoir and to a service reservoir during a charge cycle of the compressor;

determining a moisture accumulation value indicative of the extent of moisture accumulated in an air dryer during the charge cycle of a compressor;

interrupting the charge cycle of the compressor based upon the moisture accumulation value being equal to or greater than a wetness threshold and a system pressure being within a predetermined pressure range, and initiating a modified purge cycle of the air dryer, wherein the modified purge cycle includes iteratively regenerating the air dryer with air from a purge reservoir until at least one of the moisture accumulation value is less than the wetness threshold and the system pressure is outside the predetermined pressure range.

15. The method according to claim 14, wherein the modified purge cycle includes charging the purge reservoir for a predetermined maximum purge reservoir charge time and regenerating the air dryer for a maximum regenerate time during each iteration.

16. The method according to claim 14, wherein determining a moisture accumulation value includes determining the moisture accumulation value based upon an output parameter of the compressor during the charge cycle.

17. The method according to claim 14, wherein determining the moisture accumulation value based upon an output parameter of the compressor during the charge cycle includes determining the moisture accumulation value based upon flow rate of compressed air from the compressor through the air dryer during the charge cycle.

18. The method according to claim 14 further comprising:
after the moisture accumulation value is determined and before the charge cycle of the compressor is interrupted, charging the purge reservoir with compressed air from the compressor until an accumulated purge reservoir charge time reaches a predetermined maximum purge reservoir charge time.

* * * * *